United States Patent
Bremer et al.

(10) Patent No.: US 11,687,574 B2
(45) Date of Patent: Jun. 27, 2023

(54) RECORD MATCHING IN A DATABASE SYSTEM

(71) Applicant: International Business Machines Corporation, Armonk, NY (US)

(72) Inventors: Lars Bremer, Boeblingen (DE); Martin Oberhofer, Sindelfingen (DE); Karin Steckler, Herrenberg (DE); Mariya Chkalova, Stuttgart (DE); Michael Baessler, Bempflingen (DE); Holger Koenig, Boblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/215,071

(22) Filed: Mar. 29, 2021

(65) Prior Publication Data
US 2022/0309084 A1   Sep. 29, 2022

(51) Int. Cl.
| | |
|---|---|
| *G06F 16/332* | (2019.01) |
| *G06F 16/335* | (2019.01) |
| *G06F 16/33* | (2019.01) |
| *G06F 16/338* | (2019.01) |

(52) U.S. Cl.
CPC ........ *G06F 16/3322* (2019.01); *G06F 16/334* (2019.01); *G06F 16/335* (2019.01); *G06F 16/338* (2019.01)

(58) Field of Classification Search
CPC .. G06F 16/3322; G06F 16/334; G06F 16/338; G06F 16/335
See application file for complete search history.

(56) References Cited

U.S. PATENT DOCUMENTS

| | | | |
|---|---|---|---|
| 8,321,383 B2 | 11/2012 | Schumacher | |
| 9,817,888 B2 | 11/2017 | Deshpande | |
| 2006/0217999 A1* | 9/2006 | Collard | G06F 16/93 707/E17.008 |
| 2010/0094910 A1* | 4/2010 | Bayliss | G06F 16/283 707/800 |
| 2013/0325882 A1* | 12/2013 | Deshpande | G06F 16/955 707/755 |
| 2015/0100515 A1* | 4/2015 | George | G06Q 10/067 705/342 |
| 2019/0377975 A1 | 12/2019 | Pandit | |
| 2020/0356564 A1* | 11/2020 | Singh | G06F 16/24549 |

OTHER PUBLICATIONS

Arms et al., "Document Similarity in Information Retrieval", Mausam, printed on Feb. 18, 2021, 60 pages.

(Continued)

*Primary Examiner* — Kannan Shanmugasundaram
(74) *Attorney, Agent, or Firm* — Stephen R. Yoder.; Jared L. Montanaro (57) ABSTRACT

A computer implemented method comprising processing the unstructured objects of each record of records of a database for identifying a set of one or more values of attributes in the unstructured objects of the each record. The sets of unstructured attribute values of two records of the database may be compared for determining a similarity level between the two sets. It may be determined whether the two records are representing a same entity based on the comparison result.

20 Claims, 5 Drawing Sheets

(56) References Cited

OTHER PUBLICATIONS

Lovicz et al., "Beyond Matching Enterprise Golden Record Management", © 2012 Profisee Group, Inc. 31 pages, <htttps://profiseecom.z13.web.core.windows.net/Resources/White_Papers/Beyond_Matching_GRM.pdf>.

Murthy et al., "Exploiting evidence from unstructured data to enhance master data management", ResearchGate, Article in Proceedings of the VLDB Endowment • Aug. 2012, 13 pages, <https://www.researchgate.net/publication/262251451>.

Sieg, Adrien, "Text Similarities: Estimate the degree of similarity between two texts", Jul. 4, 2018, 46 pages, <https://medium.com/@adriensieg/text-similarities-da019229c894>.

* cited by examiner

RECORD MATCHING IN A DATABASE SYSTEM

BACKGROUND

The present invention relates generally to the field of digital computer systems, and more specifically, to a method for record matching in a database system.

Enterprise data matching deals with matching and linking customer data received from different sources and creating a single version of the truth. Master data management (MDM) based solutions work with enterprise data and perform indexing, matching and linking of data. The master data management system may enable access to these data. However, there is a continuous need to improve data matching to data in master data management systems.

SUMMARY

Various embodiments provide a method, computer system and computer program product as described by the subject matter of the independent claims. Advantageous embodiments are described in the dependent claims. Embodiments of the present invention can be freely combined with each other if they are not mutually exclusive. In one aspect, the invention relates to a computer implemented method for record matching in a database system, wherein a record represents an entity, the record being associated with one or more unstructured data objects. The method comprises: processing the unstructured objects of each record of records of a database (e.g., of the database system) for identifying a set of one or more values of attributes, hereinafter referred to as unstructured attribute values, in the unstructured objects of the each record; comparing the sets of unstructured attribute values of two records of the database for determining a similarity level between the two sets; determining whether the two records are representing a same entity based on the comparison result.

In another aspect, the invention relates to a computer program product comprising a computer-readable storage medium having computer-readable program code embodied therewith, the computer-readable program code configured to implement all of the steps of the method according to preceding embodiments. In another aspect, the invention relates to a computer system for record matching, wherein a record represents an entity, the record being associated with one or more unstructured data objects. The computer system is configured for: processing the unstructured objects of each record of records of a database for identifying a set of one or more values of attributes, hereinafter referred to as unstructured attribute values, in the unstructured objects of the each record; comparing the sets of unstructured attribute values of two records of the database for determining a similarity level between the two sets; and determining whether the two records are representing a same entity based on the comparison result.

BRIEF DESCRIPTION OF THE DRAWINGS

In the following embodiments of the invention are explained in greater detail, by way of example only, making reference to the drawings in which.

DETAILED DESCRIPTION

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Computer systems of service providers usually include storages for storing information related to customers and services. Some of the information may be provided when the customers fill in registration forms, service request forms or other forms such as contract documents, bank transactions, certificates etc. This may result in unstructured objects being stored in these systems. The unstructured object may be an object that comprises values of attributes in an unstructured form. Those attributes are named unstructured attributes to distinguish them from the attributes of the records which are named structured attributes. The unstructured object may enable to associate attributes to corresponding attribute values. The unstructured object may be a file, document or an object with free form text or embedded values included therein. Examples of unstructured objects may include word processing documents (e.g., Microsoft Word documents in their native format), Adobe Acrobat documents, emails, image files, video files, audio files, and other files in their native formats relative to the software application that created them. In addition, such computer systems may store data of the customers and services in a structured format in form of records of a database. This may result in a same entity such as a person being associated with information in different formats in the systems. For example, a record that represents a specific person may be associated with unstructured information of that specific person. A data record or record is a collection of related data items such as a name, date of birth and class of a particular user. A record represents an entity, wherein an entity refers to a user, object, or concept about which information is stored in the record. The terms "data record" and "record" are interchangeably used.

Hence, such computer systems may comprise records which have attributes named structured attributes and unstructured objects which have values of unstructured attributes. The value of an unstructured attribute may be a full value or one portion of the full value of the unstructured attribute. For example, the value "Street" may be a value of an unstructured attribute "Address"; however, the value "Street" is only a portion of the address and other values such as the city name may also form the full or complete value of the address.

A large part of operations performed in these computer systems may involve matching of records. The matching of records comprises comparing structured attribute values of the records. Matched records (mergeable records) are records that represent the same entity. The level of matching of two records indicates the degree of similarity of the attribute values of the two records.

The present subject matter may be advantageous as it may improve the record matching processes by making use of exiting unstructured objects such as documents. The present subject matter may gain insight from unstructured documents for decision making. This may particularly be advantageous as many industry systems may store a lot of unstructured information attached to master data. For example, in insurance, there are many insurance contracts attached to customer records. In manufacturing and utility industries, there are repair and maintenance manuals attached to product records.

According to one embodiment, the method further comprises: evaluating for each identified unstructured attribute value one or more occurrence properties, wherein the occurrence property of a specific unstructured attribute value identified in the unstructured object(s) of a specific record comprises any one of: a frequency (named first occurrence property) of occurrence of the specific unstructured attribute value in the unstructured objects of the specific record, and an indication (named second occurrence property) of other identified unstructured attribute values for that specific record which are collocated with the specific unstructured attribute value in the unstructured objects, wherein comparing the two sets of unstructured attribute values comprises comparing the evaluated occurrence properties of the unstructured attribute values of one set of the two sets with the evaluated occurrence properties of the unstructured attribute values of the other set of the two sets.

For example, if the same value is present in the two sets and has the same frequency of presence in the two sets this may provide a strong indication of the similarity of the records representing the two sets. Similarly, if the same value is present in the two sets and belongs to the same collocations in the two sets this may provide a strong indication of the similarity of the records representing the two sets. Hence, the occurrence properties may further improve the comparison accuracy of the two sets and thus improve the accuracy of the record matching process.

According to one embodiment, a record has values of attributes, hereinafter referred to as structured attributes, wherein the determining whether the two records are representing a same entity comprises: assigning an initial contribution weight to each structured attribute of the structured attributes, selecting unstructured attribute values that are similar and are present in both two sets based on the comparison result, in case a structured attribute value of the structured attribute values does not match any of the selected unstructured attributes, replacing the contribution weight of said structured attribute by a weight indicative of the similarity between the two sets, and in case a structured attribute value of the structured attribute values does match fully or partially a selected unstructured attribute, increasing the contribution weight of said structured attribute; comparing the two records using the contribution weights.

This embodiment may enable a weighted match rule to assign a weight (e.g., an integer weight) to each structured attribute of the compared records. For each structured attribute, the associated contribution weight may be multiplied by the similarity score of the two records, and the scores may be summed. If the sum equals or exceeds a threshold, then the two records being compared are considered a match. This embodiment may particularly be advantageous when comparing a large number of attributes, without having a single attribute, that is different in the two records, causing a non-match.

According to one embodiment, the method further comprises: executing an aggregation algorithm for aggregating values of the selected unstructured attribute values that form a full value of the respective unstructured attribute, resulting in zero or more aggregated values, wherein the comparison with the structured attribute values is performed using the processed selected unstructured attribute values.

For example, the selected unstructured attribute values may comprise values v1, v2, . . . and yr. Each of the values is a value of a respective unstructured attribute. However, some values may not be full values of the respective unstructured attributes. For example, v1 may be a first name value and v2 may be a last name value which are both values of the unstructured attribute "Full Name"; however, v1 and v2 are not full values. The aggregation of v1 and v2 may be the full value of the unstructured attribute "Full Name". Each of the selected unstructured attribute values may be processed to determine whether it is a full value of the respective unstructured attribute and it if it is not a full value, the other not-full values to be aggregated with it may be determined. Determining which values can be aggregated together may be performed using the second occurrence property evaluated for the selected unstructured attribute values e.g., if values are collocated in the same sentence or paragraph and are not-full values of the same unstructured attribute they may be aggregated. Alternatively, or additionally, according to one embodiment, the aggregating comprises: grouping the unstructured attribute values of each set of the sets into groups based on the category of the unstructured attributes, wherein the aggregation is performed of values belonging to the same group. The aggregation is performed of values belonging to the same group and also based on the second occurrence properties of that group.

According to one embodiment, comparing the two records comprises: comparing the values of the structured attributes of the two records resulting in an individual matching score per structured attribute of the record, combining the individual matching scores using the contribution weights. The matching score may, for example, be a value in the range 0 to 100, which represents the degree to which two values are alike. A value of 100 indicates that the two values are identical and a value of zero indicates no similarity.

According to one embodiment, in case the two records are representing a same entity merging the two records in a single record, otherwise keeping separate the two records.

Figure 1:
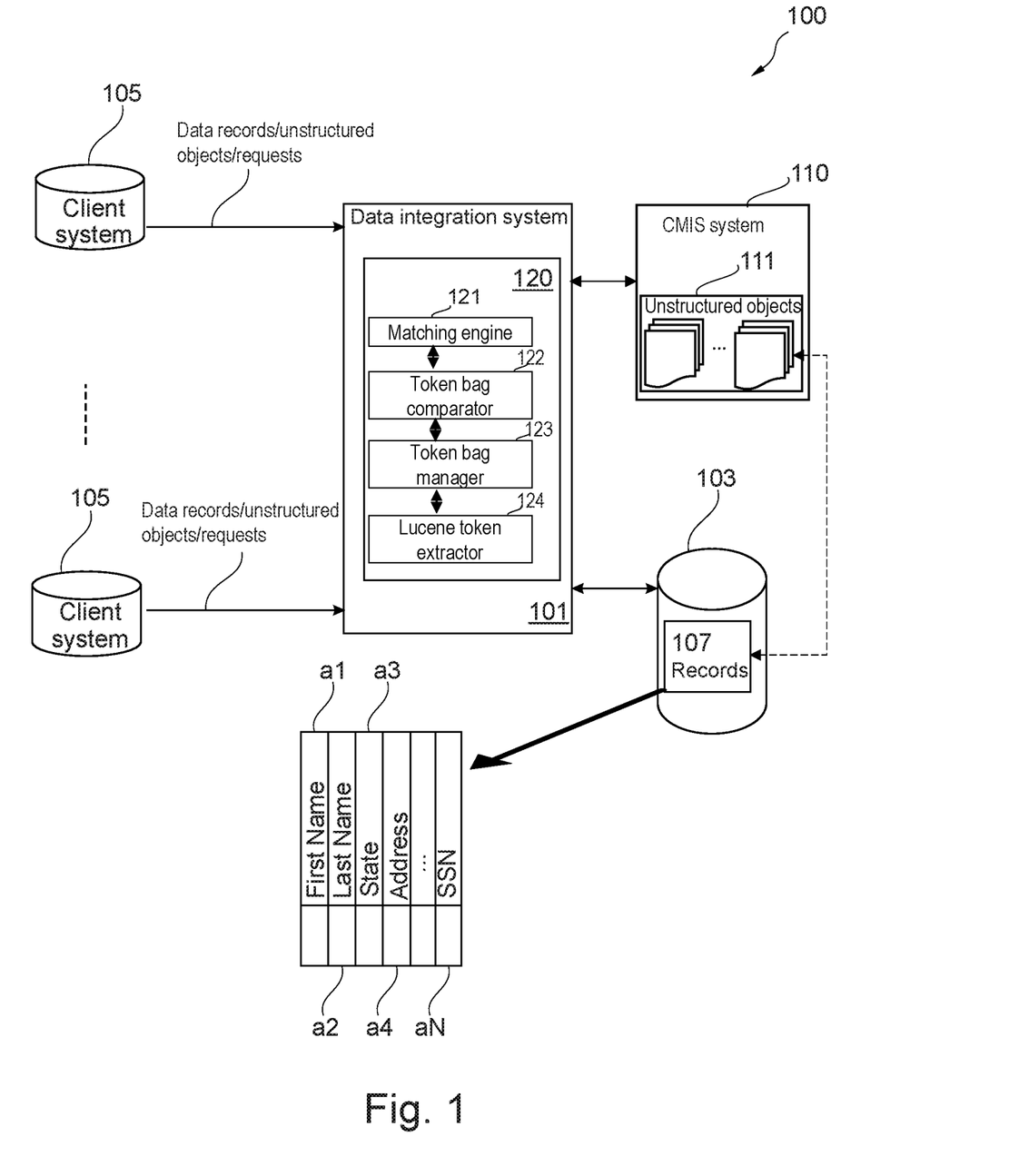
FIG. 1 is a block diagram of a database appliance in accordance with an example of the present subject matter.

FIG. 1 depicts an exemplary computer system 100. The computer system 100 may, for example, be configured to perform master data management and/or data warehousing e.g., the computer system 100 may enable a de-duplication system. The computer system 100 comprises a data integration system 101 and one or more client systems or data sources 105. The client system 105 may comprise a computer system (e.g., as described with reference to FIG. 6). The client systems 105 may communicate with the data integration system 101 via a network connection which comprises, for example, a wireless local area network (WLAN) connection, WAN (Wide Area Network) connection, LAN (Local Area Network) connection, the internet or a combination thereof. The data integration system 101 may control access (read and write accesses etc.) to a database or repository 103, referred to herein as structured repository as it comprises structured records 107. The data integration system 101 may control access (read and write accesses etc.) to another repository 110 referred to herein as unstructured repository as it comprises unstructured objects 111.

As illustrated in FIG. 1, each of the structured records 107 stored in the structured repository 103 may have values of a set of attributes $a\_1 \ldots a\_N$ ($N \geq 1$) such as a first name attribute. Although the present example is described in terms of few attributes, more or less attributes may be used. Each record 107 may represent an entity such as a person. Data records 107 stored in the central repository 103 may be received from the client systems 105 and processed (e.g., to transform them into a unified structure) by the data integration system 101 before being stored in the central repository 103. For example, the received records from the client systems 105 may have a structure different from the structure of the stored records of the central repository 103. In another example, the data integration system 101 may import data records of the central repository 103 from a client system 105 using one or more Extract-Transform-Load (ETL) batch processes or via HyperText Transport Protocol ("HTTP") communication or via other types of data exchange.

The unstructured objects 111 may, for example, comprise scanned documents or forms. Unstructured objects 111 may, for example, be received from the client systems 105. As illustrated by the dashed line, each entity or record of the structured repository 103 may be associated with one or more unstructured objects in the unstructured repository 110. For example, each record $R\_i$ of at least part of the records 107 in the structured repository 103 may be associated with $m\_i$ unstructured objects $⟦OB⟧\_1, ⟦OB⟧\_2 \ldots ⟦OB⟧\_(m\_i)$ of the unstructured repository 110, where $m\_i \geq 1$. For example, an employee having a record in the structured repository 103 describing his name, SNS etc. may also have his employment contract scanned and stored in the unstructured repository 110 e.g., the unstructured objects 111 may be provided by a CMIS enabled system. For example, in MDM systems like IBM MDM, OOTB connectors to content management systems like Filenet may enable access to the unstructured objects. For example, a master data record in the MDM system may be associated with unique resource locators allowing to find associated unstructured documents in content management system based on standards like CMIS.

The data integration system 101 may be configured to process the records 107 and the unstructured objects 111 using one or more algorithms such as an algorithm 120 implementing at least part of the present method. For example, the data integration system 101 may process data records 107 and the unstructured objects 111 using the algorithm 120 in order to identify duplicate records in the structured repository 103. Although shown as separate components, the repository 103 and/or repository 110 may be part of the data integration system 101 in another example.

In one example, the algorithm 120 may comprise a matching engine 121 for matching records. The algorithm 120 further comprises a token bag comparator 122 for comparing the sets or bags of unstructured attribute values associated with the records to be compared. The algorithm 120 further comprises a token bag manager 123 that may manage the bag determined by the token extractor 124.

Figure 2:
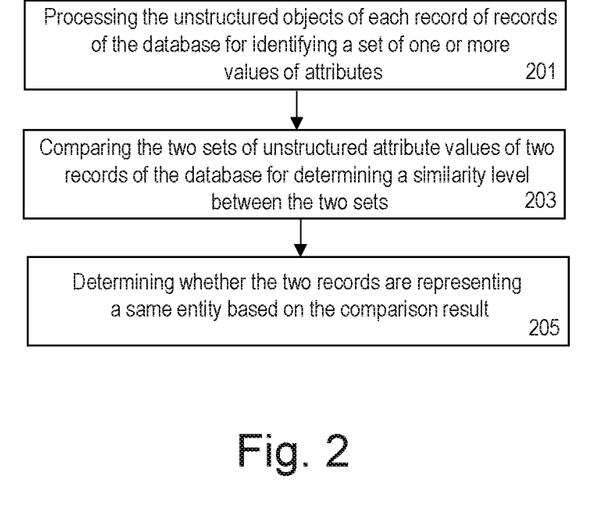
FIG. 2 is a flowchart of a method for record matching in a database system in accordance with an example of the present subject matter.

FIG. 2 is a flowchart of a method for record matching in a system in accordance with an example of the present subject matter. For the purpose of explanation, the method described in FIG. 2 may be implemented in the system illustrated in FIG. 1, but is not limited to this implementation. The method of FIG. 2 may, for example, be performed by the data integration system 101.

The unstructured objects of each record of at least part of the records of the database 103 may be processed in step 201 for identifying a set of one or more values of unstructured attributes unstructured objects of the each record. Each record of said at least part of the records may be associated with one or more unstructured objects.

In one example, the at least part of records may comprise all records of the database 103. It may be determined for each record in the database whether the record is associated with one or more unstructured objects. And the associated unstructured objects may be processed to identify values of unstructured attributes. In case the record is not associated with any unstructured object, the next unprocessed record may be processed and so on until all records are processed. Processing all records of the database may be advantageous as it may prepare a priori all information that may be ready for immediate usage at a later stage.

In one example, the at least part of records may comprise a subset of records of the database 103. It may be determined for each record of the subset of records whether the record is associated with one or more unstructured objects. And the associated unstructured objects may be processed to identify values of unstructured attributes. The subset of records may, for example, comprise only records that need to be processed by a user. This example may be advantageous as it enables an on-demand processing of records. This may save resources that would otherwise be required by processing records the results of which are not used.

The identification of the values of the unstructured attributes in an unstructured object may, for example, be performed by parsing the object and performing a data mining analysis for identifying values of attributes.

Hence, the processing of the unstructured objects of each record $R\_i$ in step 201 may result in a bag or set (named $⟦Bag⟧\_i$) of values of unstructured attributes $b\_1, b\_2 \ldots b\_(M\_i)$ where $M\_i \geq 1$. The unstructured attributes $b\_1, b\_2 \ldots b\_(M\_i)$ of each set $⟦Bag⟧\_i$ may or may not comprise attributes of the structured attributes $a\_1 \ldots a\_N$. For example, a record representing a student may comprise structured attributes such as "student ID", "class", "Age", "name" etc. while the documents 111 associated with the student may comprise values of different attributes such as "address" and/or comprise values of same attributes such as "name". The unstructured attributes of one set $⟦Bag⟧\_i$ may or may not comprise unstructured attributes of another set, that is, they may or may not share unstructured attributes with another set $⟦Bag⟧\_j$ e.g., two student records may be associated with completely different documents, one associated with insurance contract documents while the other student record is associated with a curriculum vitae; leading to different identified unstructured attributes for the two students.

Each unstructured attribute may have at least one value in the respective set $⟦Bag⟧\_i$. The at least one value may comprise duplicate values. For example, the record of an employee "X" may be associated with documents that have been processed to identify values of unstructured attributes and resulted in a bag (⟦Bag⟧_x) of identified values of unstructured attributes "car type", "phone number" and "address". The bag ⟦Bag⟧_x may comprise multiple values of the attribute "car type" e.g., the person "X" has several cars that were listed in the documents. The bag ⟦Bag⟧_x may comprise 5 duplicate values of the attribute "phone number", because the same number appears in several documents of the employee "X". In other words, the set associated with the record of person X has three unstructured attributes but may comprise multiple values per unstructured attribute.

Figure 3:
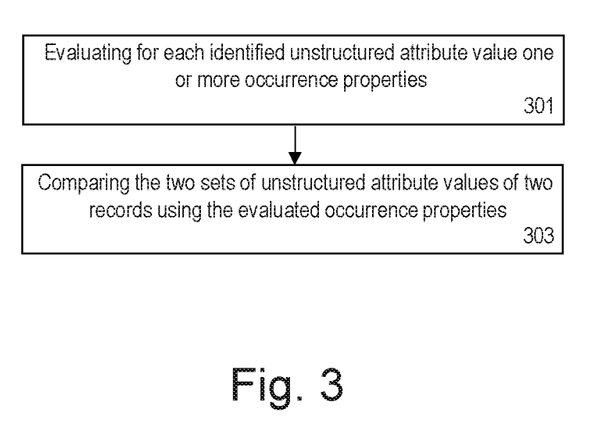
FIG. 3 is a flowchart of a method for record matching in a database system in accordance with an example of the present subject matter.

The sets of unstructured attribute values obtained in step 201 may be used to determine whether records 107 are duplicate or not. For example, two sets ⟦Bag⟧_i and ⟦Bag⟧_j of two records R_i and R_j respectively may be compared in step 203 for determining the similarity level between the two sets ⟦Bag⟧_i and ⟦Bag⟧_j. That is, the values of the unstructured attributes $b\_1, b\_2 \ldots b\_(M\_i)$ may be compared with the values of the unstructured attributes $b\_1, b\_2 \ldots b\_(M\_j)$. In one example, the comparison may be a pairwise comparison between all possible pairs of values of the two sets or may be a pairwise comparison between the pairs of values of the same unstructured attributes. This comparison may result in individual similarity scores which are combined to obtain the similarity score between the compared sets. In another example, a Jaccard Similarity algorithm may be used to compare the sets ⟦Bag⟧_i and ⟦Bag⟧_j. FIG. 3 provides an example implementation of the comparison step 203. The comparison as described herein is performed between two records but it is not limited to as more than two records may be compared by comparing their respective sets as described with the example of two records.

Hence, comparison results of step 203 may be used in step 205 to determine whether the two records are representing a same entity. The similarity level between the two sets ⟦Bag⟧_i and ⟦Bag⟧_j may be indicative of the similarity between the two records R_i and R_j respectively e.g., if the two bags are very similar, this indicates that the two records represent the same entity.

FIG. 3 is a flowchart of a method for comparing records in accordance with an example of the present subject matter. For the purpose of explanation, the method described in FIG. 3 may be implemented in the system illustrated in FIG. 1, but is not limited to this implementation. The method of FIG. 3 may, for example, be performed by the data integration system 101. The method of FIG. 3 provides an example implementation of the comparison step 203 of FIG. 2. For example, the records 107 to be compared may be associated with respective bags or sets of unstructured attribute values as described with reference to FIG. 2.

One or more occurrence properties may be evaluated in step 301 for each identified unstructured attribute value. For example, each set ⟦Bag⟧_i of unstructured attribute values may be processed in order to evaluate the occurrence properties for each unstructured attribute value of the set. That is, the occurrence properties of each value of attribute b_1 may be evaluated, the occurrence properties of each value of attribute b_2 may be evaluated etc.

In a first example, the occurrence property may be a frequency of occurrence of the unstructured attribute value in the unstructured objects of the specific record. In this case, the frequency of occurrence of the value of attribute b_1 in the bag ⟦Bag⟧_i of record R_i may be determined. Similarly, the frequency of occurrence of the value of attribute b_2 in the bag ⟦Bag⟧_i of record R_i may be determined and so on. Following the example of the employee X's record, the value of the unstructured attribute "phone number" has a frequency of occurrence of 5 because it appeared 5 times in the documents associated with the employee X.

In a second example, the occurrence property of each value in a set ⟦Bag⟧_i of a record R_i may be an indication of other values in that same set ⟦Bag⟧_i which are collocated with said each value in the unstructured objects. For example, for each record R_i, the values of the unstructured attributes of the respective set ⟦Bag⟧_i may be processed to identify how often and which attribute values are mentioned together in the same sentence or paragraph.

Thus, the comparison of two records R_i and R_j may be performed in step 303 by comparing the evaluated occurrence properties of the unstructured attribute values of one set ⟦Bag⟧_i with the evaluated occurrence properties of the unstructured attribute values of the other set ⟦Bag⟧_j. For example, if the same values are present in the two sets ⟦Bag⟧_i and ⟦Bag⟧_j and have the same frequency of presence in the two sets this may provide a strong indication of the similarity of the records R_i and R_j.

Figure 4:
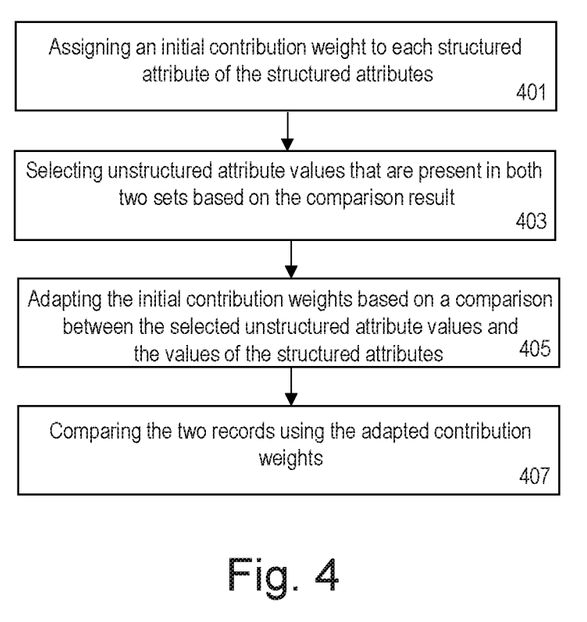
FIG. 4 is a flowchart of a method for record matching in a database system in accordance with an example of the present subject matter.

FIG. 4 is a flowchart of a method for comparing records in accordance with an example of the present subject matter. For the purpose of explanation, the method described in FIG. 4 may be implemented in the system illustrated in FIG. 1, but is not limited to this implementation. The method of FIG. 4 may, for example, be performed by the data integration system 101. For example, the method of FIG. 4 may compare two records R_i and R_j.

An initial contribution weight may be assigned in step 401 to each structured attribute of the structured attributes $a\_1 \ldots a\_N$. For example, for comparing two employee records the attribute "employee ID" may be assigned a higher weight than the attribute "first name" because two employees may have the same first name but may unlikely have the same employee ID. Thus, the employee ID may advantageously have a higher contribution in the matching decision. For example, an integer weight may be assigned to each structured attribute $a\_1 \ldots a\_N$ of the compared records R_i and R_j.

The unstructured attribute values that are similar and are present in the two sets ⟦Bag⟧_i and ⟦Bag⟧_j of the two records R_i and R_j may be selected in step 403. This may, for example, be performed by intersecting the two sets ⟦Bag⟧_i and ⟦Bag⟧_j. FIG. 5C to 5D provide an example implementation of step 403. Step 403 may result in a set referenced by ⟦Bag⟧_i ∩ ⟦Bag⟧_j which comprises the selected unstructured attribute values.

The initial contribution weights may be adapted or adjusted in step 405. This adaptation may be performed by comparing the unstructured attribute values in the intersection set ⟦Bag⟧_i ∩ ⟦Bag⟧_j with the values of the structured attributes $a\_1 \ldots a\_N$ in the two records R_i and R_j. For example, in case a structured attribute value of the structured attribute values does not match any of the selected unstructured attributes, the contribution weight of said structured attribute may be replaced by a weight indicative of the similarity between the two sets. In case a structured attribute value of the structured attribute values does match fully or partially a selected unstructured attribute, the contribution weight of said structured attribute may be increased by a predefined value.

The two records R_i and R_j may be compared in step 407 using the contribution weights. The pair of values of each attribute of the structured attributes a_1 ... a_N may be compared, resulting in N similarity scores. The N similarity scores may be combined by, for example, using a weighted sum by multiplying the adapted contribution weights by the respective similarity scores, and summing the scores. The resulting score may be compared to a threshold to determine whether the two records R_i and R_j are duplicate or not duplicate records.

Figure 5A:
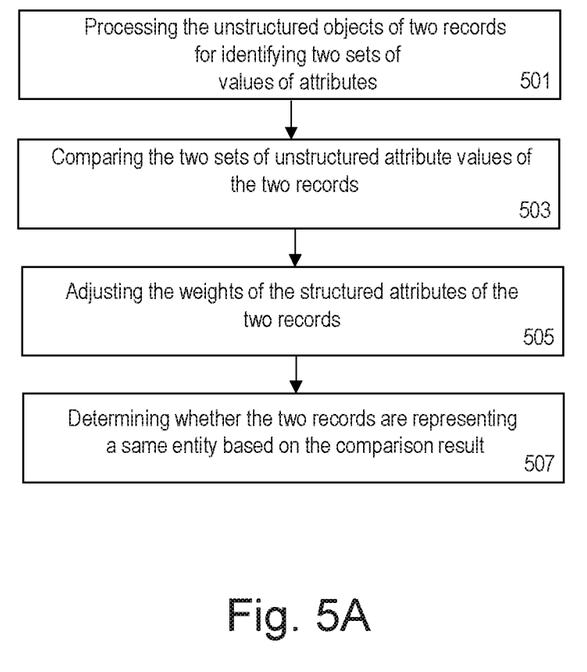
FIG. 5A is a flowchart of a method for comparing two records in accordance with an example of the present subject matter.
Figure 5B:
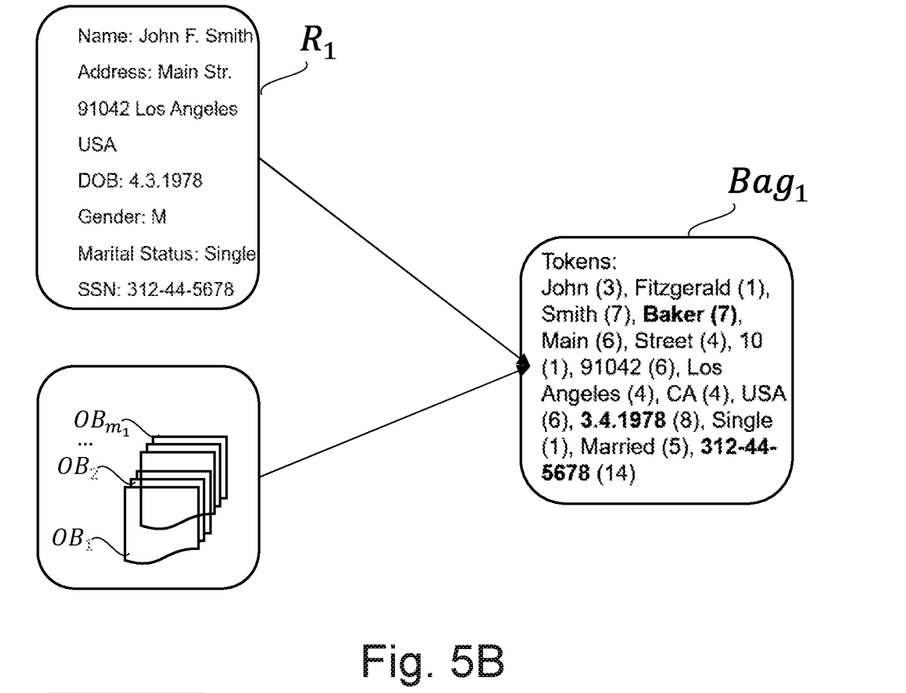
FIG. 5B shows a record associated unstructured objects and the resulting set of unstructured attribute values.
Figure 5C:
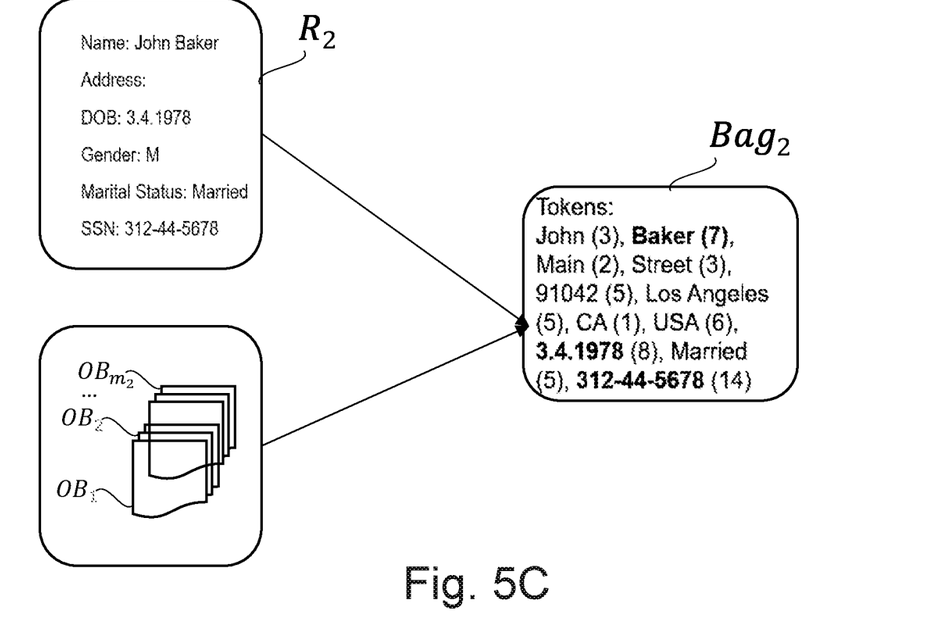
FIG. 5C shows a record associated unstructured objects and the resulting set of unstructured attribute values
Figure 5D:
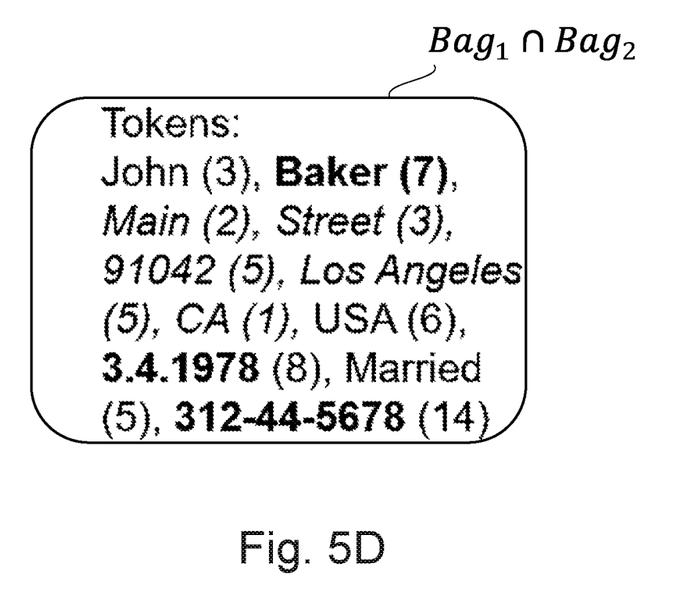
FIG. 5D shows a result of comparison between two sets of unstructured attribute values.

FIG. 5A is a flowchart of a method for comparing records in accordance with an example of the present subject matter. For the purpose of explanation, the method described in FIG. 5A may be implemented in the system illustrated in FIG. 1, but is not limited to this implementation. The method of FIG. 5A may, for example, be performed by the data integration system 101. FIGS. 5B and 5C shows the two records (e.g. MDM records) to be compared, R_1 and R_2. As also shown in FIGS. 5B and 5C, the record R_1 is associated with a set of unstructured objects ⟦OB⟧ _1, ⟦OB⟧ _2 ... OB_(m_1) and the record R_2 is associated with a set of unstructured objects ⟦OB⟧ _1, ⟦OB⟧ _2 ... ⟦OB⟧ _(m_2). For example, the record R_1 may be associated with 14 documents while R_2 may be associated with 17 documents. The two records R_1 and R_2 represent persons such as employees. The two records R_1 and R_2 have values of structured attributes such as "Name", "Address", date of birth ("DOB"), "gender", "marital status" and "SSN". Each of the structured attributes may be assigned a contribution weight as follows: Weight of Name: Medium, Weight of Address: Medium, Weight of DOB: High, Weight of Gender: Very Low, Weight of Marital Status: High, Weight of SSN: Very High. The values high, medium, and very high may be represented by respective integer numbers that can be used to perform weighted sums.

The documents associated with each of the two records may be processed in step 501 in order to identify values of unstructured attributes. This may result in one set (also named entity token bag) of unstructured values ⟦Bag⟧ _1 for record R_1 as show in FIG. 5B and in one set of unstructured values ⟦Bag⟧ _2 for record R_2 as shown in FIG. 5C. Step 501 may enable to analyze related unstructured content for a MDM record using entity detection modules to detect person names, addresses, personal sensitive information and other entities of interest. As shown in FIGS. 5B and 5C, each of the two sets ⟦Bag⟧ _1 and ⟦Bag⟧ _2 comprises values such as "John" which is a value of an unstructured attribute being "name", and "USA" which is a value of an unstructured attribute being "state" etc.

Each of the values of the two sets ⟦Bag⟧ _1 and ⟦Bag⟧ _2 may be associated with an occurrence property. This is shown in FIGS. 5B and 5C, where each value is associated with its frequency of occurrence. For example, the value "Street" appeared 4 times in the 14 documents associated with the record R_1 while it appeared 3 times in the 17 documents associated with the record R_2. For example, all extracted values may be stored along with their frequency and entity relation score (which indicates how often and which entities are mentioned together in the same sentence, paragraph) in a so-called entity token bag. The entity relation score may be the second occurrence property defined herein.

The two sets ⟦Bag⟧ _1 and ⟦Bag⟧ _2 may be compared in step 503 to calculate a similarity score for the whole bag. For example, similar bags may have a high number of same values and very identical entity relation scores. For that, an intersection set or bag may be determined in step 503. The intersection bag may be determined by including in the intersection bag only values which exist in all bags ⟦Bag⟧ _1 and ⟦Bag⟧ _2. The resulting intersection bag ⟦Bag⟧ _1∩⟦Bag⟧ _2 is shown in FIG. 5D. As shown in FIG. 5D, values written in Normal fonts appear in all bags ⟦Bag⟧ _1 and ⟦Bag⟧ _2 with the same frequency. Values written in Italic font appear in all bags ⟦Bag⟧ _1 and ⟦Bag⟧ _2 but with different frequency. Values written with Bold font appears in both bags ⟦Bag⟧ _1 and ⟦Bag⟧ _2 but not in all structured record attributes. For example, the value "Baker" of the intersection set is not part of record R_1; it is thus written in Bold font.

The intersection bag may be used in step 505 to adjust the weights assigned to the structured attributes of the records R_1 and R_2.

For example, if the intersection bag has a same value of an unstructured attribute IATT with same frequency and which does not match the value of the structured attribute ATT that corresponds to said unstructured attribute IATT, the weight of said structured attribute ATT may be replaced with a token bag weight. These types of values (e.g., of IATT) are written in bold font indicating that the matching based on said structured attribute ATT may be wrong.

If the intersection bag has a same value of IATT with same frequency for something which does partially or fully match a structured attribute, the weight of said structured attribute ATT may be scaled up. These types of values (e.g., of IATT) are written in normal font indicating that the matching based on said attribute may get re-enforced.

If the intersection token bag has same value but with a different frequency for something which does only partially match a structured attribute (e.g., address or name), the weight of said structured attribute may be scaled up. These types of values (e.g., of IATT) are written in italic font indicating that the matching based on said attribute may enable a course correct partial match.

It may be determined in step 507 whether the two records are representing the same entity based on a comparison of the two records R_1 and R_2 using the adjusted weights.

Figure 6:
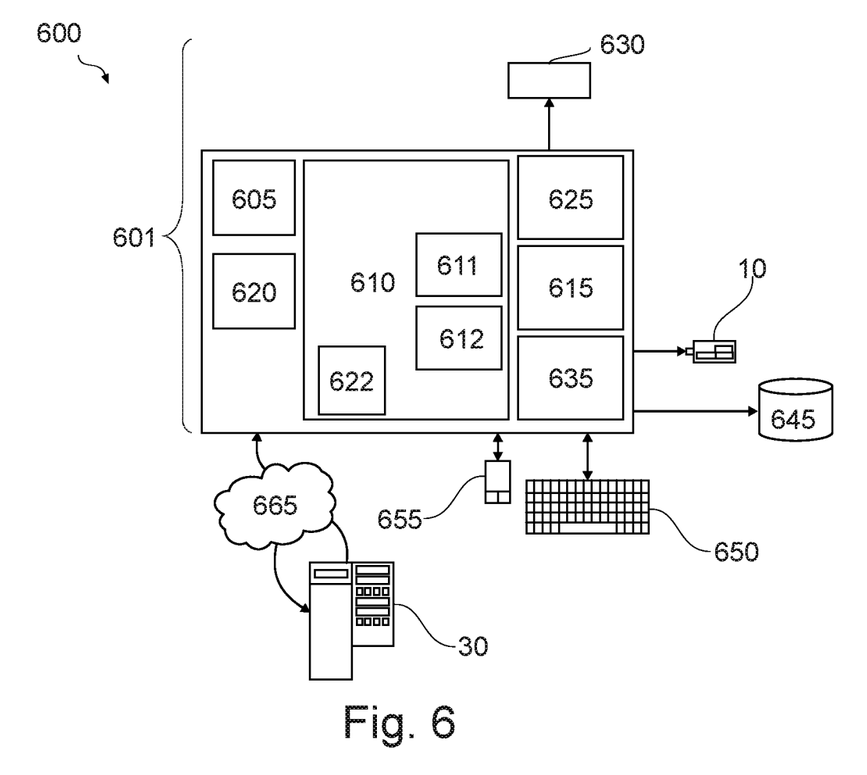
FIG. 6 represents a computerized system, suited for implementing one or more method steps as involved in the present subject matter.

FIG. 6 represents a general computerized system 600 suited for implementing at least part of method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 612, 622 (including firmware 622), hardware (processor) 605, or a combination thereof. In exemplary embodiments, the methods described herein are implemented in software, as an executable program, and is executed by a special or general-purpose digital computer, such as a personal computer, workstation, minicomputer, or mainframe computer. The most general system 600 therefore includes a general-purpose computer 601.

In exemplary embodiments, in terms of hardware architecture, as shown in FIG. 5, the computer 601 includes a processor 605, memory (main memory) 610 coupled to a memory controller 615, and one or more input and/or output (I/O) devices (or peripherals) 10, 645 that are communicatively coupled via a local input/output controller 635. The input/output controller 635 can be, but is not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 645 may generally include any generalized cryptographic card or smart card known in the art.

The processor 605 is a hardware device for executing software, particularly that stored in memory 610. The processor 605 can be any custom made or commercially available processor, a central processing unit (CPU), an auxiliary processor among several processors associated with the computer 601, a semiconductor-based microprocessor (in the form of a microchip or chip set), or generally any device for executing software instructions.

The memory 610 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 610 can have a distributed architecture, where various components are situated remote from one another, but can be accessed by the processor 605.

The software in memory 610 may include one or more separate programs, each of which comprises an ordered listing of executable instructions for implementing logical functions, notably functions involved in embodiments of this invention. In the example of FIG. 5, software in the memory 610 includes instructions 612 e.g., instructions to manage databases such as a database management system.

The software in memory 610 shall also typically include a suitable operating system (OS) 411. The OS 611 essentially controls the execution of other computer programs, such as possibly software 612 for implementing methods as described herein.

The methods described herein may be in the form of a source program 612, executable program 612 (object code), script, or any other entity comprising a set of instructions 612 to be performed. When a source program, then the program needs to be translated via a compiler, assembler, interpreter, or the like, which may or may not be included within the memory 610, so as to operate properly in connection with the OS 611. Furthermore, the methods can be written as an object-oriented programming language, which has classes of data and methods, or a procedure programming language, which has routines, subroutines, and/or functions.

In exemplary embodiments, a conventional keyboard 650 and mouse 655 can be coupled to the input/output controller 635. Other output devices such as the I/O devices 645 may include input devices, for example but not limited to a printer, a scanner, microphone, and the like. Finally, the I/O devices 10, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 645 can be any generalized cryptographic card or smart card known in the art. The system 600 can further include a display controller 625 coupled to a display 630. In exemplary embodiments, the system 600 can further include a network interface for coupling to a network 665. The network 665 can be an IP-based network for communication between the computer 601 and any external server, client and the like via a broadband connection. The network 665 transmits and receives data between the computer 601 and external systems 30, which can be involved to perform part, or all of the steps of the methods discussed herein. In exemplary embodiments, network 665 can be a managed IP network administered by a service provider. The network 665 may be implemented in a wireless fashion, e.g., using wireless protocols and technologies, such as WiFi, WiMax, etc. The network 665 can also be a packet-switched network such as a local area network, wide area network, metropolitan area network, Internet network, or other similar type of network environment. The network 665 may be a fixed wireless network, a wireless local area network W(LAN), a wireless wide area network (WWAN) a personal area network (PAN), a virtual private network (VPN), intranet or other suitable network system and includes equipment for receiving and transmitting signals.

If the computer 601 is a PC, workstation, intelligent device or the like, the software in the memory 610 may further include a basic input output system (BIOS) 622. The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute software 612 stored within the memory 610, to communicate data to and from the memory 610, and to generally control operations of the computer 601 pursuant to the software. The methods described herein and the OS 611, in whole or in part, but typically the latter, are read by the processor 605, possibly buffered within the processor 605, and then executed.

When the systems and methods described herein are implemented in software 612, as is shown in FIG. 5, the methods can be stored on any computer readable medium, such as storage 620, for use by or in connection with any computer related system or method. The storage 620 may comprise a disk storage such as HDD storage.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for record matching in a database system, the method comprising:
 identifying records representing respective entities, wherein a record of the identified records comprises structured attributes;
 assigning an initial contribution weight to the structured attributes;
 identifying one or more unstructured data objects corresponding to the records;
 processing the one or more unstructured data objects to identify unstructured attribute values corresponding to respective records of the identified records;
 identifying entity relation scores corresponding to the identified records, wherein an entity relation score indicates how often an entity represented by a record occurs alongside a selected entity;
 comparing two records based, at least in part, on the updated contribution weight of the selected structured attribute and a comparison of the entity relation scores and the unstructured attribute values of the two records to determine a similarity level between the two records;

selecting unstructured attribute values that are present with respect to the identified records; and responsive to determining a structured attribute value of the structured attribute values does not match any of the selected unstructured attributes, replacing the contribution weight of said structured attribute by an updated contribution weight indicative of the similarity between the two records of the identified records.

2. The method of claim 1, further comprising:

evaluating one or more occurrence properties corresponding to the identified unstructured attribute values, wherein the occurrence property of a specific unstructured attribute value identified in the unstructured object(s) of a specific record is selected from the group consisting of:

a frequency of occurrence of the specific unstructured attribute value in the unstructured data objects of the specific record, and an indication of other identified unstructured attribute values for that specific record which are collocated with the specific unstructured attribute value in the unstructured data objects, wherein comparing two sets of unstructured attribute values corresponding to the two records comprises comparing the evaluated occurrence properties of the unstructured attribute values of one set of the two sets with the evaluated occurrence properties of the unstructured attribute values of the other set of the two sets.

3. The method of claim 1, further comprising grouping the unstructured attribute values into groups based on their category, wherein the comparison between the two sets is performed by comparing groups of the same category.

4. The method of claim 1, further comprising:

responsive to determining a selected structured attribute value matches at least one unstructured attribute value present with respect to each of two records, increasing the initial contribution weight of a selected structured attribute associated with the selected structured attribute value.

5. The method of claim 4, wherein the selecting comprises intersecting the two sets resulting in an intersection set.

6. The method of claim 5, wherein the unstructured attribute value is a portion of a full value of the unstructured attribute, the selecting further comprising executing an aggregation algorithm for aggregating values of the selected unstructured attribute values that form a full value of the respective unstructured attribute, resulting in zero or more aggregated values, wherein the comparison with the structured attribute values is performed with the processed selected unstructured attribute values.

7. The method of claim 2, wherein the aggregating comprises grouping the unstructured attribute values into groups based on their category, wherein the aggregation is performed for values belonging to the same group.

8. The method of claim 2, wherein the selected unstructured attribute values are present with a same occurrence frequency in each of the two sets.

9. The method of claim 6, wherein comparing the two records comprises: comparing the values of the structured attributes of the two records resulting in an individual matching score per structured attribute of the record, combining the individual matching scores using the contribution weights and comparing the combined score with a predefined threshold.

10. The method of claim 1, further comprising merging the two records in a single record wherein the two records represent a same entity.

11. The method of claim 1, occurring responsive to receiving a respective request for matching the records.

12. The method of claim 1, further comprising repeating the method for comparing further records of the database until all records of the database are compared.

13. The method of claim 1, being performed by a master data management (MDM) system, wherein the compared records are MDM records, wherein the processing of the one or more unstructured data objects is performed by an entity detection module of the master data management system.

14. The method of claim 1, wherein the unstructured data objects correspond to documents.

15. The method of claim 14, wherein the unstructured data objects correspond to scanned documents.

16. The method of claim 1, further comprising providing to a person associated with the compared records information indicative of the unstructured data objects associated with the two records.

17. The method of claim 1, occurring responsive to storing the compared records.

18. The method of claim 5, wherein the intersection set comprises the selected unstructured attribute values.

19. A computer program product for record matching in a database system, the computer program product comprising:

one or more computer readable storage media and program instructions stored on the one or more computer readable storage media, the program instructions comprising instructions to:

identify records representing respective entities wherein a record of the identified records comprises structured attributes;

identify one or more unstructured data objects corresponding to the records;

process the one or more unstructured data objects to identify unstructured attribute values corresponding to respective records of the identified records;

identify entity relation scores corresponding to the identified records, wherein the entity relation score indicates how often an entity represented by a record occurs alongside a selected entity;

compare two records based, at least in part, on the increased initial contribution weight of the selected structured attribute and a comparison of the entity relation scores and the unstructured attribute values of the two records to determine a similarity level between the two records;

select unstructured attribute values that are present with respect to the identified records; and responsive to determining a structured attribute value of the structured attribute values does not match any of the selected unstructured attributes, replace the contribution weight of said structured attribute by an updated contribution weight indicative of the similarity between the two records of the identified records.

20. A computer system for record matching, wherein a record represents an entity, the record being associated with one or more unstructured data objects, the computer system comprising:

one or more computer processors:

one or more computer readable storage media and program instructions stored on the one or more computer readable storage media, the program instructions comprising instructions to:

identify records representing respective entities wherein a record of the identified records comprises structured attributes;

identify one or more unstructured data objects corresponding to the records;
process the one or more unstructured data objects to identify unstructured attribute values corresponding to respective records of the identified records;
identify entity relation scores corresponding to the identified records, wherein the entity relation score indicates how often an entity represented by a record occurs alongside a selected entity;
compare two records based, at least in part, on the increased initial contribution weight of the selected structured attribute and a comparison of the entity relation scores and the unstructured attribute values of the two records to determine a similarity level between the two records;
select unstructured attribute values that are present with respect to the identified records; and
responsive to determining a structured attribute value of the structured attribute values does not match any of the selected unstructured attributes, replace the contribution weight of said structured attribute by an updated contribution weight indicative of the similarity between the two records of the identified records.

* * * * *